United States Patent [19]

Betteken et al.

[11] 4,195,064
[45] Mar. 25, 1980

[54] UNITIZED CATALYTIC REACTOR CONSTRUCTION

[75] Inventors: Joseph C. Betteken, St. Louis; Jerome D. McDaniel, Chesterfield, both of Mo.

[73] Assignee: Monsanto Company, St. Louis, Mo.

[21] Appl. No.: 933,700

[22] Filed: Aug. 15, 1978

[51] Int. Cl.² .......................... C01B 17/80; B01J 8/04
[52] U.S. Cl. .................................. 422/191; 422/160; 422/195; 422/221
[58] Field of Search ............... 422/161, 160, 191, 221, 422/311, 179, 194, 195

[56] References Cited

U.S. PATENT DOCUMENTS

| | | | |
|---|---|---|---|
| 1,856,040 | 4/1932 | Krebs et al. | 422/161 X |
| 2,104,858 | 1/1938 | Ferguson | 422/161 X |
| 2,483,178 | 9/1949 | Boninger | 422/221 |
| 2,491,536 | 12/1949 | Tyson | 422/144 |
| 2,512,562 | 6/1950 | Cummings | 422/194 X |
| 2,590,293 | 3/1952 | Armstrong | 422/311 X |
| 2,614,034 | 10/1952 | Brummerstedt | 422/311 X |
| 2,632,692 | 3/1953 | Korin et al. | 422/191 |
| 2,843,592 | 7/1958 | Ludwig et al. | 422/311 X |
| 2,887,365 | 5/1959 | De Rycker et al. | 422/203 |
| 2,893,851 | 7/1959 | Georgian | 422/139 |
| 3,203,770 | 8/1965 | Ranum | 422/221 X |
| 3,235,344 | 2/1966 | Dreyer et al. | 422/221 X |
| 3,425,810 | 2/1969 | Scott | 422/191 |
| 3,429,653 | 4/1969 | Lee et al. | 122/510 |
| 3,477,825 | 11/1969 | Lannert et al. | 422/311 X |
| 3,482,946 | 12/1969 | Shirk | 422/142 |
| 3,503,440 | 3/1970 | Romanus | 165/162 |
| 3,647,360 | 3/1972 | Jaeger | 422/161 X |
| 3,889,438 | 6/1975 | Piepers et al. | 52/668 |
| 3,977,834 | 8/1976 | Alcock et al. | 422/194 X |
| 4,013,024 | 3/1977 | Kochey et al. | 110/98 R |

Primary Examiner—Barry S. Richman
Attorney, Agent, or Firm—Arthur E. Hoffman

[57] ABSTRACT

A multistage catalytic reactor of unitized internal construction whereby the vertical support columns for the division plates and the catalyst support grids comprise a unitized structure from the top to the bottom of the reactor and are fixedly attached at their respective ends to the top and bottom of the reactor. The reactor further includes horizontal beams for support of a catalyst support grid or mesh, at least some of said beams being mounted for movement relative to said vertical columns through windows or openings in at least a portion of said columns. The beams are of such length that they either (i) span as a chord across the reactor or (ii) at least one end of the beam abuts a vertical column with sufficient clearance to allow for expansion. At each junction between a beam and a window in a vertical column as well as where a beam end abuts a vertical column, the beam is supported on a rocker means affixed to the column so that the beam is free to move as it expands and contracts. In one embodiment the reactor is constructed with the first catalytic stage at the bottom.

7 Claims, 12 Drawing Figures

DETAIL 'A'

DETAIL 'B'

UNITIZED CATALYTIC REACTOR CONSTRUCTION

BACKGROUND OF THE INVENTION

This invention provides a multistage catalytic reactor of unitized internal construction for dividing the reactor into a plurality of catalytic reaction stages and support within each stage of one or more beds of catalyst particles.

In the sulfuric acid industry and in other industries using large catalytic reactors which must be constructed at the plant site, present commercial construction of the reactor internals is hazardous and expensive. Typically at the present time, in large sulfuric acid plant reactors for catalytic oxidation of sulfur dioxide to sulfur trioxide the internal division plates separating the reactor into the several catalytic stages and the catalyst support grids in each stage are supported on a plurality of columns within the reactor in a more or less unfastened, stacked manner so that the resulting internal structure is not unitized and can be quite unsteady, particularly in the larger diameter reactors.

Reactor design favors the use of the largest diameter reactor possible so that the catalyst bed in each stage can be as shallow as possible offering lower pressure drop as the gas or other fluid passes through the catalyst bed and better conversion efficiency. With plants being designed today for production of 1,000 and more metric tons per day of sulfuric acid, reactors of 40 to 50 feet (about 12 to 15 meters) in diameter are not uncommon. At such large diameters, collapse of the reactor internals during construction or during operation is of serious concern, requiring special precautions and increased costs. Severe injury and death is an ever-present hazard and occasionally occur.

FIGS. 2 and 3 of the drawings show one typical such construction presently used. Only a portion of a reactor is shown in these figures for a brief discussion of the problem. Vessel 1 contains division plates 2 (one shown) and catalyst support grids 3 (one shown) which merely rest on horizontal flanges 4 of vertical support columns 5, and at the periphery of vessel 1 they rest on an annular flange 6. FIG. 3 shows a top view of how the catalyst support grid 3 is formed by a plurality of triangularly shaped perforated plates 7 (perforations not shown) supported at each appex by a horizontal flange 4 of a vertical support column 5. In this typical type of present construction, to maximize structural stability as much as non-unitized construction will permit the vertical support columns 5 are usually not spaced more than on 3 to 4 feet (about 1 to 1.3 meters) apart. Loading of catalyst into each reactor stage with the equipment which has been developed is rather difficult with such closely spaced vertical columns.

Such construction techniques were developed to enable use of a construction which allows for thermal expansion and contraction of the internals between atmospheric temperature and the high operating temperatures attained in a catalytic reactor, particularly with exothermic reactions.

A fully loaded operating reactor develops tremendous internal forces. Internal weights of 1.5 million pounds (about 3.3 million kilograms) of catalyst, catalyst support screens and grids, division plates and vertical support columns are not uncommon. The force of this weight plus the downward force of the pressure drop through the several catalyst beds places the internal construction under very high compression which is transmitted to the bottom of the vessel through the vertical support columns 5 as shown by the downward arrow in FIG. 2. These downward forces are equally balanced by a very high upward tension force in the outer circumference of the vessel from its base to its top as shown by the upward arrow in FIG. 2, causing deflection of the base of the vessel 1 around its circumference as shown in FIG. 4, unless the base is securely fastened to a massive concrete foundation by bolts strong enough to minimize or prevent such deflection. Any significant deflection which does occur will of course contribute to instability of the non-unitized internal structure and its possible collapse. Yet tie-downs sufficiently strong to prevent or reduce the deflection which would otherwise occur requires an extremely massive and strong (in tension) foundation and tie-down system.

Another disadvantage of current construction of catalytic reactors is that such non-unitized construction techniques require that the first stage of a multistage catalytic reactor be at the top of the vessel. Moreover, to better resist the forces against the top of the vessel, the top normally is made with a domed shape, which is more expensive than a flat-top would be.

Typically, the gas or other fluid stream being processed is charged into the first catalytic stage at sufficient pressure to provide for the entire pressure drop through the entire subsequent process. This means sufficient pressure to provide for the pressure drop through the several beds of catalyst (e.g., usually 3 or 4 catalyst stages), plus through the equipment the fluid is caused to flow through between each stage. For example, in an exothermic reaction such as oxidation of sulfur dioxide, the gas stream is cooled between each catalytic stage by flowing through one or more gas-to-gas heat exchangers or through waste heat boilers, and in some processes also through an intermediate absorption tower for recovery of sulfur trioxide between two of the catalytic stages. Thus, the first catalytic stage is at substantially higher pressure than the second stage, which in turn is at higher pressure than the third stage, and so on.

To accommodate this with a non-unitized internal construction requires that the highest pressure stage (i.e., the first stage) be at the top of the reactor, with the next highest pressure stage (i.e., the second stage) just below the first stage, and so on; otherwise, if a higher pressure stage were located below a lower pressure stage, the pressure differential could cause lifting of the division plate between the two stages causing leakage of the gas or other fluid past the division plate directly into the lower pressure stage and possible collapse of the internals. Yet for several reasons, it is not advantageous to have the first catalytic stage at the top of the reactor. Any dusts such as fly ash, etc. in a gas stream charged to the catalytic reactor are removed by the catalyst bed in the first stage where the catalyst bed acts as a filter for such dusts. Thus, the first stage catalyst bed must be removed at relatively frequent intervals for cleaning and then re-installed, yet in a large reactor the first stage may be 40 to 50 feet (12 to 15 meters) above the foundation of the reactor. Also, to minimize pressure drop and to maximize conversion efficiency in the first stage it would be advantageous to make the diameter of the reactor larger at the first stage so as to accommodate the same amount of catalyst with a shallower bed depth, but such construction is not feasible at the top of a vessel. Presently, to accomplish this, it is necessary to use two catalytic reactors, one for the first stage and the second reactor for the subsequent stages. Thus, an internal construction which permits placing the first catalytic stage at the bottom of the reactor would offer both process and cost advantages not presently being concurrently attained.

Thus, for safety and cost, there is a definite need for a unitized internal support construction in multistage catalytic reactors which avoids the danger of collapse, better distributes internal forces so as to eliminate or reduce the propensity for deflection of the bottom of the vessel, provides a more open internal vertical support column structure for easier access of automatic catalyst charging equipment to all regions of the interior of the reactor, permits construction of catalytic reactors of even greater diameter than present without risk of collapse and injury, and/or permits construction of catalytic reactors having the first catalyst stage at the bottom of the vessel.

SUMMARY OF THE INVENTION

It is accordingly the objective of this invention to provide a unitized internal construction for the support of the several division plates and catalyst support grids in a multistage catalytic reactor which accommodates thermal expansion and contraction of the internal members without the risk of collapse.

This invention further provides a unitized internal vertical support column structure which ties the top of the reactor vessel to the bottom thereof so that at least part of the internal tension forces from the top of such reactor are resisted by the vertical support column structure rather than solely by the outer shell of the reactor, thus reducing or eliminating distortion or deflection of the bottom of the reactor around the periphery thereof.

This invention further provides a unitized internal construction for a multistage catalytic reactor which permits the first catalytic stage of the reactor to be placed at the bottom thereof and further permits such first stage, if desired, to be of larger diameter than subsequent stages.

This objective and these features of the invention are obtained by a unitized multistage catalytic reactor as set forth below.

The multistage catalytic reactor of this invention is of the type which comprises a large diameter cylindrical vessel divided into a plurality of catalytic stages by a plurality of circular division plates supported on a plurality of vertical columns, and within each such stage an open grid support for a bed of catalyst, with fluid inlet and outlet means to each such stage disposed such that when in operation the fluid entering each such stage is caused to flow through one or more beds of catalyst contained therein before exiting such stage. In such a reactor this invention relates to an improvement which comprises providing as unitized support for said catalyst support grids within each such stage:

(a) a plurality of horizontally disposed beams for support of said catalyst support grids, said beams in turn being supported by said vertical columns as set forth below, (b) at least a major portion of said vertical columns comprising a unitized structure from the top to the bottom of said vessel and being fixedly attached at both ends to said top and bottom of said vessel, (c) at least a portion of said vertical columns being windowed along their length with said beams movably passing through said windows, (d) each such beam being of such length that either (i) said beam spans as an internal chord from one point on the inner circumference of said vessel to another point on said circumference and is movably supported by conventional means at both ends or (ii) at least one end of said beam abuts one of the remaining vertical columns with sufficient clearance therefrom to allow for thermal expansion without exertion of substantial force thereon, (e) in combination with each junction between a beam and a window in a support column, a rocker means affixed to the support column and upon which the beam is supported, (f) in combination with each junction between an end of a length of beam and a support column, a rocker means affixed to the support column and upon which the end of the beam is supported, and (g) wherein each rocker means is affixed to the support column such that the surface of the rocker means in contact with the beam is free to move in conjunction with the beam as the beam thermally expands and contracts.

With this type of construction, thermal movement of each length of beam due to expansion and contraction can be limited to relatively short lengths of beams.

Such multistage catalytic reactors are typically of three or four catalytic stages, but this invention is equally applicable to reactors of two stages or of five or more stages; the number of stages not being a limitation of this invention.

Similarly, although this invention is described in terms of one catalyst bed per stage, it will be obvious to those skilled in the art that two or more catalyst beds can be used in any or all stages, each catalyst bed being supported on a grid as described herein.

In the embodiment wherein the first catalytic stage is at the bottom of the reactor, the diameter of the reactor at the first stage may be the same as or larger than the diameter thereof at subsequent stages. This invention further makes it possible to construct, if desired, multistage reactors wherein each of the catalytic stages is of larger diameter than the subsequent stage.

BRIEF DESCRIPTION OF THE DRAWINGS

The nature of this invention and its novel features will be more fully understood from the following description and shown in the drawings in which:

FIGS. 2, 3 and 4 representing the prior art have been discussed above in conjunction with the background of this invention.

DESCRIPTION OF THE PREFERRED EMBODIMENT

Figure 1:
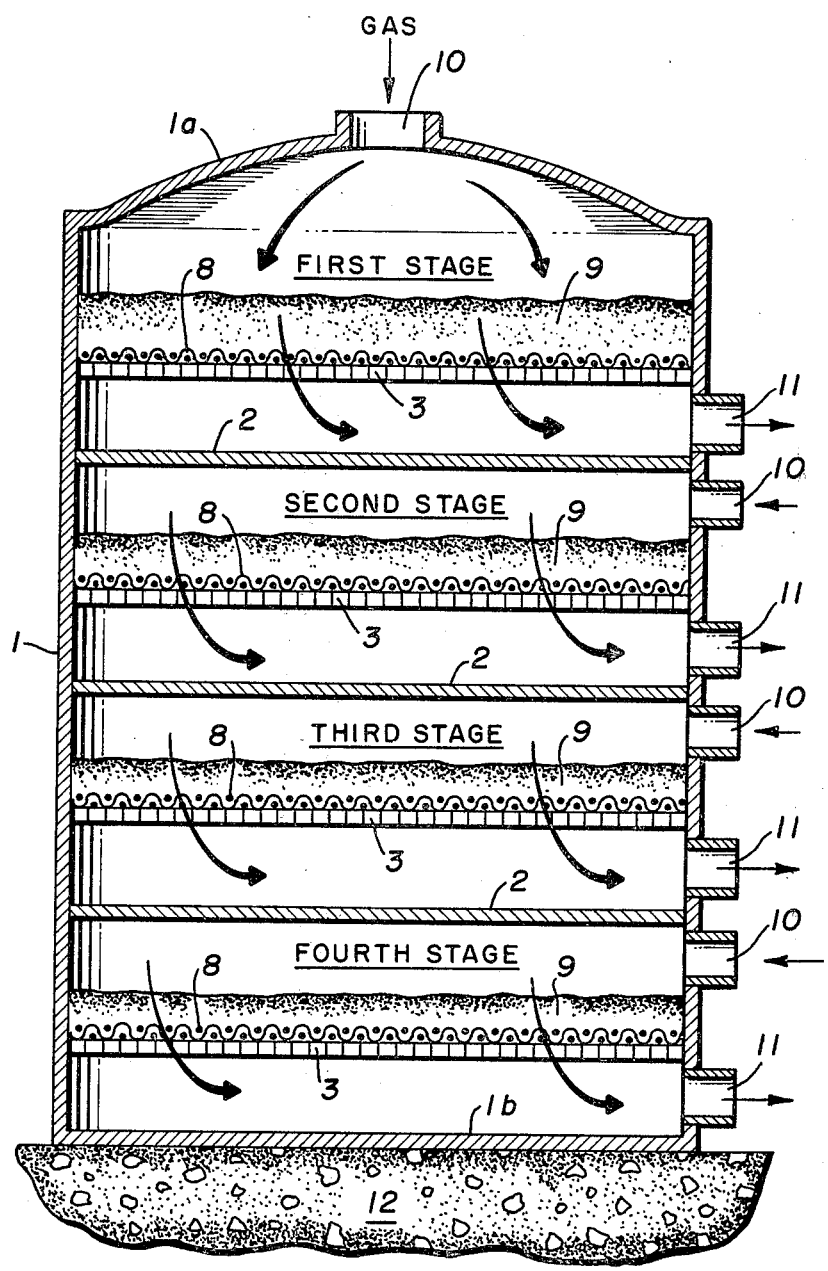
FIG. 1 is a side section of a multistage catalytic reactor of one embodiment of this invention. The purpose of FIG. 1 is to generally show the type of reactor to which this invention relates. Most of the internal support members are omitted from FIG. 1 for clarity.
Figure 2:
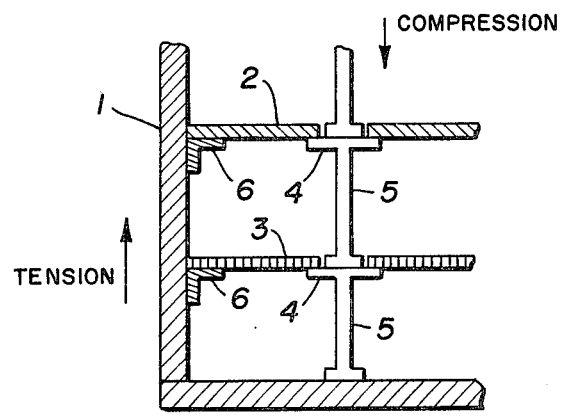
FIG. 2 is a fragmented side section of just one stage of a reactor showing a typical non-unitized support construction presently in commercial use.

FIG. 1 shows a typical multistage catalytic reactor to which this invention relates, without details of the internal unitized support construction for the division plates and catalyst support grids. The reactor comprises a vessel 1 having a top 1a and bottom plate 1b. The vessel shown here is divided into four catalytic stages by division plates 2. Within each stage is a catalyst support grid 3 which may be a screen, a perforated plate or an open network rigid metal member such as a grate providing at least 40 percent, and preferably 60 to 70% open area for flow of fluid therethrough. When grid 3 is a screen, the catalyst is supported directly thereon. In instances where the openings in the grid are larger than the catalyst pellets or other shaped catalyst particles being supported, a wire mesh 8 is normally placed over grid 3, such wire mesh having openings small enough that the catalyst particles will not pass through the wire mesh. Finally, a catalyst bed 9 is placed on top of the support in each catalytic stage.

Each stage of the reactor is provided with a fluid inlet port 10 disposed about the level of the catalyst bed 9 in such stage, and with a fluid outlet port 11 disposed below the catalyst support grid 3 in such stage. Thus, the gas or other fluid stream being treated is caused to flow into each stage through inlet port 10, through one or more catalyst beds 9 contained in each stage, and then out of that stage through outlet port 11.

The bottom plate 1b of vessel 1 rests on a concrete foundation 12 and is fastened down to the foundation by bolts or other conventional tie-down means (not shown). Normally, for access to the interior of the reactor, a series of man-holes (not shown) are also provided for access to each catalytic stage both above the catalyst bed 9 and below the catalyst support grid 3.

Figure 5:
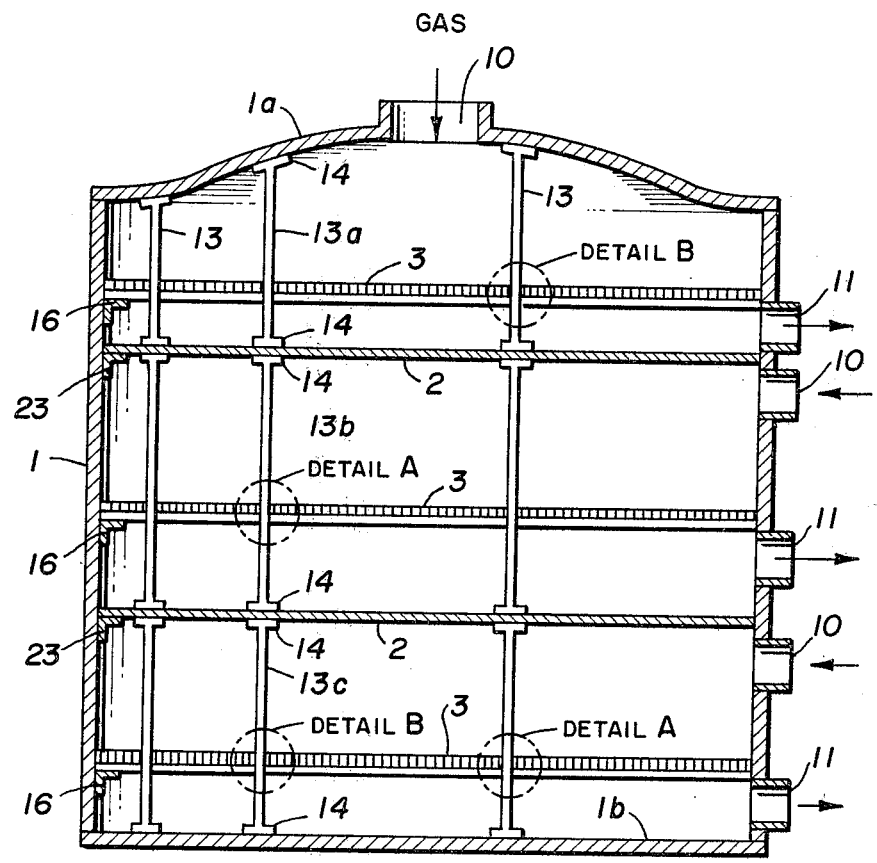
FIG. 5 is a side section of a typical three-stage catalytic reactor with one embodiment of the unitized internal support structure of this invention.

FIG. 5 shows one embodiment of the unitized vertical support column construction of this invention. For clarity only a few of the vertical support columns 13 are shown. In the three-stage reactor shown in FIG. 5 each vertical support column 13 is made up of lengths of vertical support columns 13a, 13b and 13c, each length being the height of the catalytic stage in which it is located and each length ending at both ends with horizontal flanges 14. Starting from the bottom plate 1b of vessel 1, the bottom length of support column 13c is fixedly attached at its lower end to the bottom plate 1b and at its upper end to the lower division plate 2. Similarly, the next length of support column 13b is fixedly attached at its lower end to lower division plate 2 and at its upper end to the upper division plate 2. Finally, the next length of support column 13a is similarly fixedly attached to top division plate 2 and to the top 1a of vessel 1.

Such fixed attachment of horizontal flanges 14 to the top 1a and bottom 1b of vessel 1 and to the division plates 2 can be by any conventional method such as welding, bolts or other fixed attachment means. For most applications, welding is preferred. In this way an integral unitized vertical support column structure is provided which rigidly joins the bottom 1b of vessel 1 to the top 1a thereof, such that internal stresses, either in compression or in tension, developing within the reactor are carried at least in part by the plurality of vertical support columns 13 contained in the reactor, rather than requiring the shell of vessel 1 to carry all such stresses.

Figure 7:
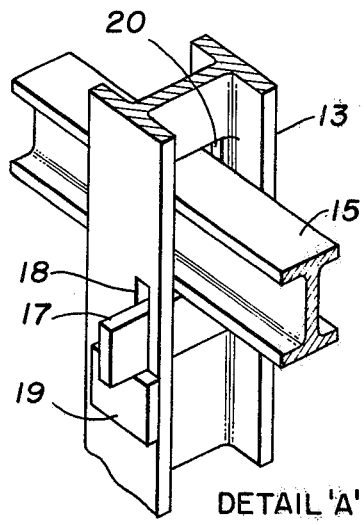
FIGS. 7 and 8 are detailed perspective views of one embodiment of Details A and B, respectively from FIGS. 5 and 6, showing junctions between the vertical support columns and support beams for the catalyst support columns which comprise embodiments of this invention.
Figure 8:
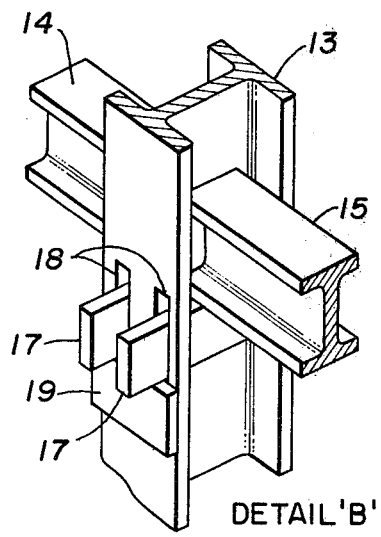
Figure 10:
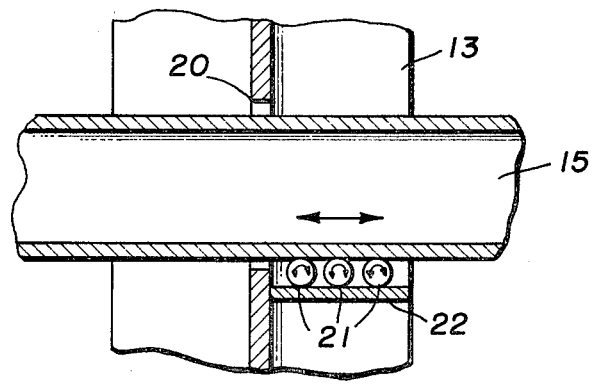
FIG. 10 is a detailed side view of another embodiment of Detail A.

In FIG. 5, no detail is shown of the support for catalyst support grids 3. For this, FIG. 5 refers to Details A and B, one embodiment of which is shown in FIGS. 7 and 8 respectively, and another embodiment of which is shown in FIG. 10.

Figure 6:
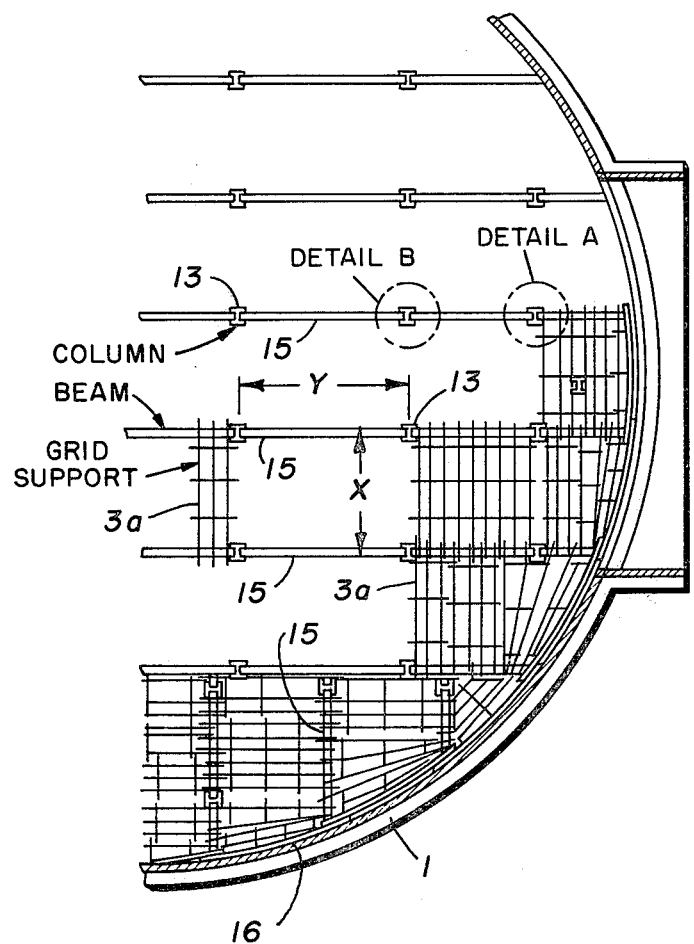
FIG. 6 is a fragmented top section of one catalyst support grid with its unitized support means which comprises one embodiment of this invention.

FIG. 6 is a top fragmented sectional view of one catalyst support grid 3 within a reactor. In this embodiment catalyst support grid 3 is made up of a plurality of gratings 3a which span across and rest on a plurality of horizontal beams 15. Not all of gratings 3a are shown for clarity in describing how these gratings are supported. Beams 15 are supported on vertical support columns 13 by rocker means such as are shown in Details A and B, i.e., in FIGS. 7, 8 and/or 10. It should be noted that around the periphery of vessel 1, the grates 3a are designed so as to conform to the inner wall of cylindrical vessel 1. It should also be noted that grates 3a can be designed such that each grate section nests with adjacent grate sections and with the vertical support columns 13 such that they cannot shift sufficiently to fall off their supports.

Because of this open grid and beam construction, vertical support columns 13 can be spaced further apart in the vessel than has been feasible in the past. As designated by distances X and Y in FIG. 6, in large diameter reactors columns 13 can advantageously be spaced from about 4 to 10 or more feet (1.2 to 3 or more meters) apart; the spacing used being selected according to such design criteria as the size of the reactor, the total weight being supported and the internal stresses the support columns and other internals are subjected to. One skilled in the art can easily determine the optimum number and spacing of the vertical support columns 13 for any given reactor design, application and materials of construction.

Figure 3:
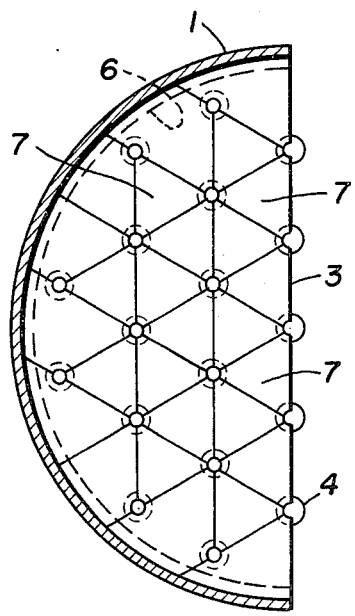
FIG. 3 is a fragmented top section further showing a typical prior art non-unitized construction of the catalyst support grid of FIG. 2.
Figure 4:
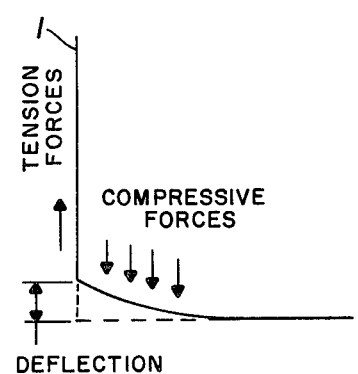
FIG. 4 is a conceptualized depiction of the deflection of the bottom of a reactor constructed as in FIGS. 2 and 3 which results from internal forces in compression in tension.

Nor is it necessary to use the rectangular pattern shown in FIG. 6 for the lay out of beams 15. A triangular pattern much like that shown in FIG. 3 may be used as well as other pattern or combination of patterns as may be devised by those skilled in the art.

One advantage of this invention is that beams 15 need not be single length spanning long distances across the inside of the reactor. For ease of installation it is preferred to use short beam lengths of 5 to 12 feet (1.5 to 3.7 meters). In fact, in very large diameter vessels, it is specifically desired to avoid use of beams so long that their movement under thermal expansion and contraction will be greater than can readily be accommodated by the rocker support means shown in FIGS. 7, 8 and 10. Beams 15 are supported by the vertical support columns 13; along their length as shown in Detail A (FIG. 7), and at the junction between two lengths of beam 15 as shown in Detail B (FIG. 8). At the inner circumference of the wall of vessel 1, beams 15 are supported by an annular flange 16 affixed to the wall, or by other conventional means such as, for example, hangers or posts protruding from the vessel wall, etc. The use of hangers to support the beams around inlet and outlet ports 10 and 11 and around man-hole access ports to the reactor is particularly advantageous.

Turning now to FIGS. 7 and 8 showing the details of support of the beams 15 by vertical support columns 13, it can be seen that beams 15 are supported by the vertical support columns 13 in such a way that the beams are free to move under the influence of thermal expansion and contraction with respect to vertical support columns 13, thus placing no lateral stresses on the vertical support columns.

Figure 7A:
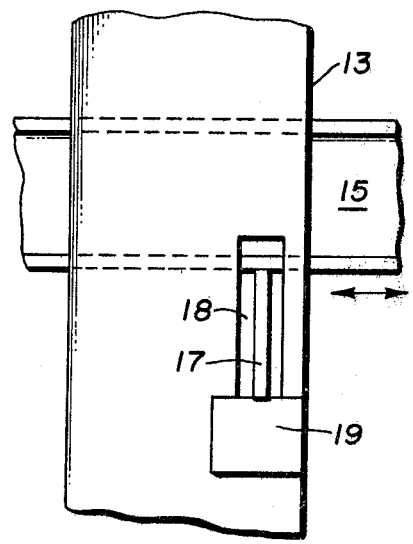
FIG. 7a is a side view of Detail A showing further details of FIG. 7.

In the embodiment shown in FIG. 7, a single beam 15 is supported along its length by a rocker means such as rocker plate 17 which loosely fits through a slot 18 in both vertical flanges of an I-beam type of vertical support column 13. Rocker plate 17 in turn is supported on a pair of plates 19 (one shown), one of plates 19 being fixedly attached to each of the vertical flanges of vertical support column 13. Alternatively, plates 19 can be dispensed with and the rocker plate 17 may simply rest on the bottom of the slots 18 in each flange. Beam 15 extends through a window 20 in the web of vertical support column 13 which is cut somewhat larger than the size of beam 15 to provide a loose fit so that beam 15 will not bind in the window 20 as the beam longitudinally expands and contracts. Typically, a ¼ inch (about 0.6 cm.) clearance is sufficient. Similarly, as shown in FIG. 7a slot 18 is preferably cut somewhat wider than the thickness of rocker plate 17 so that as beam 15 expands and contracts, rocker plate 17 can rock back and forth in conjunction with such longitudinal movement of beam 15. If the fit of rocker plate 17 into slot 18 is too tight, rocker plate 17 will not be free to rock with longitudinal expansion and contraction of beam 15 and the beam would then have to slide across plate 17. In such case, the coefficient of friction between plate 17 and beam 15 would result in binding and lateral stresses on vertical support column 13, particularly under heavy catalyst loadings. Typically, a slot 18 which is about ¼ inch (about 0.6 cm.) wider than the thickness of rocker plate 17 is sufficient. However, one skilled in the art can readily determine the necessary clearance knowing the coefficient of expansion of the beam, the distance between vertical support columns, and the maximum and minimum temperatures to which the reactor is designed.

In FIG. 8 is shown how the ends of two lengths of beams 15 are supported at a junction with a vertical support column 13. At such junctions, no window need be cut into the web of vertical support column 13. The end of each beam is provided sufficient clearance from the web of column 13 to allow for thermal expansion of each beam 15, again typically ¼ inch (about 0.6 cm.). Each beam end is supported on a rocker plate 17 which is loosely resting within slots 18 in the vertical flanges of column 13.

Thus far the invention has been described in terms of the use of I-beams as the vertical support columns 13 and as beams 15. Though wide flange I-beams are preferred because their wide flanges restrain beam ends from lateral movement, support columns and beams of other shapes can also be used as will be apparent to those skilled in the art; such as for example standard I-beams, cylindrical rods or tubing, square or rectangular tubing, L-beams, T-beams, etc.

Nor is the invention limited to rocker plates 17 for support of beams 15. Rather any movable support means can be used which offers a low coefficient of friction and a rocking action under longitudinal expansion and contraction of the beam. For example, in the alternate embodiment shown in FIG. 10, the lower flange 15a of beam 15 rests on one or more short cylinders 21 (three shown) which are disposed with their longitudinal axis transverse to the longitudinal axis of beam 15 between the vertical flanges of an I-beam type of vertical support column 13. Cylinders 21 in turn rest on a plate 22 fixedly fastened between the vertical flanges of column 13 on one side of the web thereof. With expansion and contraction of beam 15 cylinders 21 will roll with the movement of the beam. In the embodiment shown in FIG. 10, beam 15 passes through window 20 in the web of column 13 for support along its length. However, this type of support may also be used for support of the ends of beams 14 in equivalent manner to that shown in FIG. 8 by providing similar support cylinders on the other side of the web of column 13 as well.

In the embodiments described thus far, division plates 2 are advantageously solid plates of a diameter nearly equal to the internal diameter of vessel 1. Division plates 2 are usually supported at their circumference by welding or bolting to annular flanges 23 fixedly attached to the inner circumference of vessel 1. This provides a gas-tight construction around the circumference of the division plates.

Figure 9:
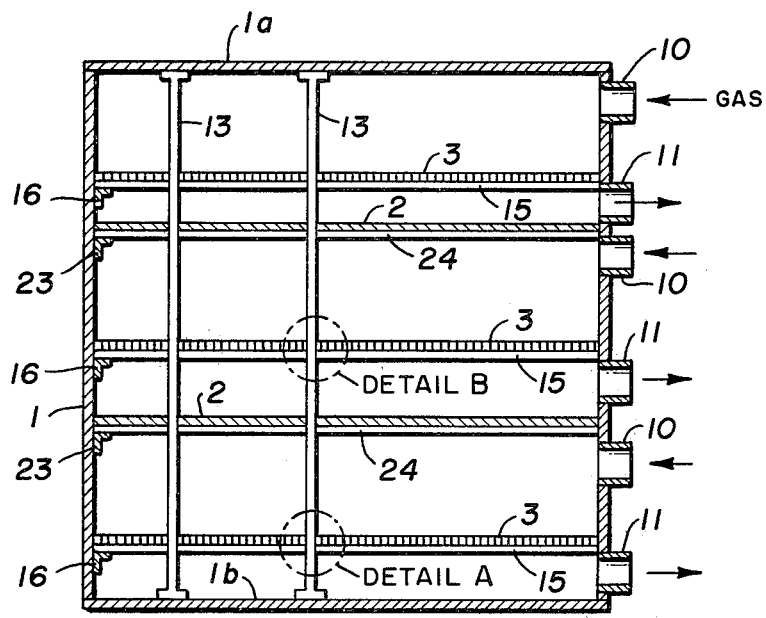
FIG. 9 is a side section of a typical three-stage catalytic reactor with another embodiment of the unitized internal support structure of this invention.

In FIG. 9, however, is shown another embodiment of this invention wherein the unitized vertical support column construction of the reactor is accomplished using vertical support columns 13 comprising a single continuous column extending from top 1a to the bottom plate 1b of vessel 1. In this embodiment, columns 13 extend through the division plates 2 and supports such as beams 24 are used for support of the division plates 2. Beams 24 may be supported in the same manner as heretofore discussed with respect to support for beams 15 and as shown in FIGS. 7, 7a, 8 and 10. Alternatively, the division plates may be supported on angle irons, washers, hangers, pins, or other conventional means fastened onto columns 13. Welding or a thermally stable packing should also be used to provide a gas-tight seal in division plates 2 where columns 13 pass through, preferably the division plates will be welded to columns 13.

Conventional fabrications of the division plates may be used in practice of this invention. In small diameter vessels the division plates may be constructed in one piece and placed in the vessel. In larger diameter vessels, it is most advantageous however to fabricate each division plate right in the reactor from a plurality of smaller plate sections which are welded together in place to form the division plate. Conventional temporary or permanent supports may be used during such fabrication of the division plate.

The unitized construction of this invention which fixedly connects the top 1a to the bottom plate 1b of vessel 1, and particularly where the division plates 2 are also fixedly attached to the vertical support columns 13, makes it possible to design multistage catalytic reactors with their first catalytic stage at the bottom of the reactor. Such an embodiment is shown in FIG. 11.

Figure 11:
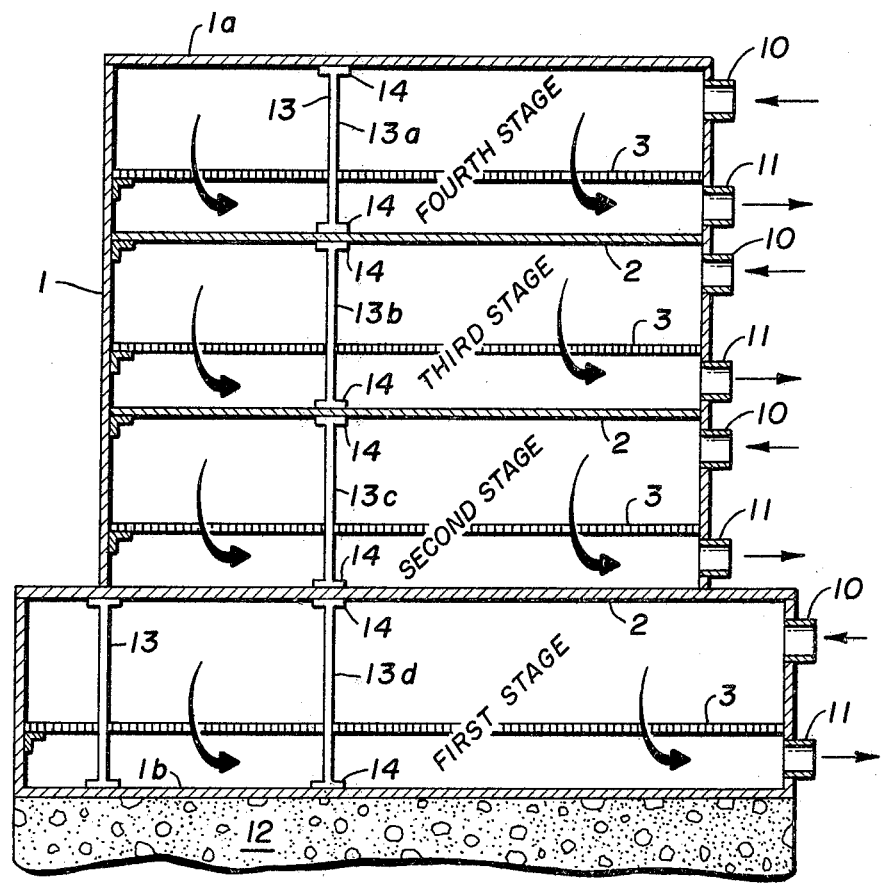
FIG. 11 is a side section of an embodiment of this invention showing a multistage catalytic reactor with the first stage at the bottom of the reactor.

The catalytic reactor shown in FIG. 11 is similar to the reactor of FIG. 5 except that the catalytic stages are reversed with the first stage being at the bottom. Otherwise all numbered parts correspond to the same numbered parts explained above with respect to FIG. 5. As with FIG. 5, the details of the support for the catalyst support grids 3 has been omitted for clarity, but the catalyst support grids are supported as shown in FIGS. 7, 8 and 10.

With the first stage at the bottom of the reactor, there are no structural problems which prevent making the first stage of larger diameter, if desired, than subsequent catalytic stages. This allows the use of shallower catalyst beds in the first stage, with less pressure drop through the bed and lower bed velocities so that residence time of the gas or other fluid in the catalyst bed need not, unless desired, be reduced.

Though the principles of this invention are particularly advantageous in providing strong unitized internal support construction in large diameter reactors and/or where severe thermal expansion and contraction is a problem as a result of the differential between high operating temperatures and atmospheric temperatures during shut-downs, this invention is not limited to such situations. Moreover by tying the top of the vessel to the bottom thereof through vertical support columns 13, and particularly when the highest pressure stage, i.e., the first catalytic stage is at the bottom of the reactor, it is not necessary to use expensive domed construction of the top to resist internal pressures.

Moreover, the unitized internal construction of this invention is very advantageous for use in high pressure catalytic reactors, i.e., those operating at 2-3 atmospheres or greater internal gas pressures.

Thus, it will be apparent to those skilled in the art that the foregoing description and drawings of the preferred embodiments are not limiting, and are not intended as limiting, of this invention. The inventive concept set forth herein can find many applications and many variations on and modifications to the embodiments described herein may be made without departing from the spirit and scope of this invention.

What is claimed is:

1. In a vertical multistage catalytic reactor of the type comprising a large diameter cylindrical vessel divided into a plurality of superimposed serially disposed catalytic stages by a plurality of circular division plates supported on a plurality of vertical columns, and within each such stage an open grid support for a bed of catalyst, with fluid inlet and outlet means to each such stage disposed such that when in operation the fluid entering each such stage is caused to flow through the bed of catalyst contained therein before existing such stage, the improvement which comprises providing as unitized support for said catalyst support grids within each such stage:

(a) a plurality of horizontally disposed beams for support of said catalyst support grids, said beams in turn being supported by said vertical columns as set forth in (d) through (g) below, (b) at least a major portion of said vertical columns comprising a unitized structure from the top to the bottom of said vessel and being fixedly attached at the respective ends thereof to said top and bottom of said vessel, (c) at least a portion of said vertical columns being windowed along their length with at least some of said beams being mounted for movement relative to said vertical columns through said windows, (d) each such beam being of such length that either (i) said beam spans as a chord from one point on the inner circumference of said vessel to another point on said circumference and is movably supported by conventional means at both ends or (ii) at least one end of said beam abuts one of the remaining vertical columns with sufficient clearance therefrom to allow for thermal expansion without exertion of substantial force thereon, (e) in combination with each junction between a beam and a window in a support column, a rocker means affixed to the support column and upon which the beam is supported, (f) in combination with each junction between an end of a length of beam and a support column, a rocker means affixed to the support column and upon which the end of the beam is supported, and (g) wherein each rocker means is affixed to the support column such that the surface of the rocker means in contact with the beam associated therewith is free to move as the beam thermally expands or contracts along its longitudinal axis.

2. A vertical multistage catalytic reactor as in claim 1 wherein said unitized vertical column structure comprises within each catalytic stage a plurality of vertical columns, upon which each division plate is at least partially supported, each end of such support column which contacts a division plate surface being fixedly attached thereto.

3. A vertical multistage catalytic reactor as in claims 1 and 2 wherein at least a portion of the rocker means comprises a vertical plate inserted into a slot in said support column sufficiently larger in width than the thickness of the plate so that said plate can rock back and forth within said slot to accommodate thermal expansion and contraction of the beam supported thereon.

4. A vertical multistage catalytic reactor as in claims 1 or 2 wherein at least a portion of the rocker means comprises at least one cylindrical roller supported on a horizontal plate which is fixedly attached to the support column.

5. A vertical multistage catalytic reactor as in claim 1 wherein the first catalytic stage is at the bottom of said vessel.

6. A vertical multistage catalytic reactor as in claim 5 wherein the diameter of said vessel at said first stage is greater than the diameter of said vessel at the subsequent catalytic stages.

7. A vertical multistage catalytic converter as in claims 5 or 6 wherein said unitized vertical column structure comprises within each catalytic stage a plurality of vertical columns, upon which each division plate is at least partially supported, each end of such support column which contacts a division plate surface being fixedly attached thereto.

* * * * *